(12) United States Patent
Goji et al.

(10) Patent No.: US 12,098,302 B2
(45) Date of Patent: Sep. 24, 2024

(54) AQUEOUS ADHESIVE FOR TENNIS BALL

(71) Applicant: Sumitomo Rubber Industries, Ltd., Hyogo (JP)

(72) Inventors: Sho Goji, Kobe (JP); Takehiko Hyodo, Kobe (JP); Kazuyoshi Shiga, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 77 days.

(21) Appl. No.: 17/684,517

(22) Filed: Mar. 2, 2022

(65) Prior Publication Data

US 2022/0282131 A1 Sep. 8, 2022

(30) Foreign Application Priority Data

Mar. 3, 2021 (JP) ................. 2021-033951

(51) Int. Cl.
*A63B 37/00* (2006.01)
*C09J 109/10* (2006.01)
*C08K 3/22* (2006.01)
*C08K 3/36* (2006.01)
*C08K 5/40* (2006.01)
*C08K 5/44* (2006.01)

(52) U.S. Cl.
CPC ............ *C09J 109/10* (2013.01); *A63B 37/00* (2013.01); *C08K 2003/2237* (2013.01); *C08K 2003/2296* (2013.01); *C08K 3/36* (2013.01); *C08K 5/40* (2013.01); *C08K 5/44* (2013.01)

(58) Field of Classification Search
CPC . C09J 109/10; C08K 5/40; C08K 5/44; C08K 2003/2237; C08K 2003/2296
See application file for complete search history.

(56) References Cited

U.S. PATENT DOCUMENTS

| | | | | | |
|---|---|---|---|---|---|
| 5,413,333 | A | * | 5/1995 | Janes ................ | A63B 39/00 273/61 R |
| 5,569,545 | A | * | 10/1996 | Yokono .............. | B32B 15/08 428/626 |
| 2007/0078448 | A1 | * | 4/2007 | Lipman .............. | A61B 18/18 606/9 |
| 2020/0109318 | A1 | * | 4/2020 | Hyodo ............... | C09J 109/08 107/2 |

FOREIGN PATENT DOCUMENTS

| | | | | | |
|---|---|---|---|---|---|
| CN | 104411796 | A | * | 3/2015 | ......... A61F 13/15 |
| JP | S57-179265 | A | | 11/1982 | |
| JP | 2004-148022 | A | | 5/2004 | |
| JP | 2020-059838 | A | | 4/2020 | |
| WO | WO2021/024835 | A1 | * | 2/2021 | ......... C09J 107/02 |

OTHER PUBLICATIONS

US2022027557 as English translation of WO2021024835A1 (Year: 2022).*
CN104411796 English translation (Year: 2015).*

* cited by examiner

*Primary Examiner* — Catherine S Branch
*Assistant Examiner* — Huihong Qiao
(74) *Attorney, Agent, or Firm* — Studebaker & Brackett PC

(57) ABSTRACT

The aqueous adhesive for a tennis ball includes rubber latex. The rubber latex is a mixture of liquid rubber latex and solid rubber latex. When a solid content in the aqueous adhesive is measured at a temperature of 140° C. by a curelastometer, a torque is not less than 0.26 N·m after 10 minutes from start of heating. The tennis ball includes a seam portion formed of the aqueous adhesive for a tennis ball.

11 Claims, 2 Drawing Sheets

AQUEOUS ADHESIVE FOR TENNIS BALL

CROSS-REFERENCE TO RELATED APPLICATION

This application claims priority on and the benefit of Patent Application No. 2021-033951 filed in JAPAN on Mar. 3, 2021. The entire disclosures of this Japanese Patent Application are hereby incorporated by reference.

BACKGROUND OF THE INVENTION

Field of the Invention

The present disclosure relates to aqueous adhesives for tennis balls. More specifically, the present disclosure relates to aqueous adhesives used for producing regulation tennis balls.

Description of the Related Art

A tennis ball includes a core. The core is a hollow sphere. The core is formed by adhering two hemispherical half cores to each other. The two half cores are adhered to each other by using an adhesive. An outer surface of the core is covered with two pieces of dumbbell-shaped felt (also referred to as melton). The melton is also adhered to the outer surface of the core by using an adhesive. A seam portion is formed in a gap between the two pieces of the melton.

Seam glue is used for forming the seam portion. The seam glue is formed of a rubber composition in general. JP2004-148022 (Patent Literature 1) discloses solvent-based seam glue obtained by dissolving a rubber composition including base rubber such as natural rubber and the like, titanium oxide, sulfur, and the like in an organic solvent such as naphtha or the like.

The seam glue is adhered to a side surface of melton before the melton is adhered to the core. For example, multiple pieces of melton are stacked and thereafter immersed in seam glue, whereby the seam glue is adhered to the side surfaces of the stacked pieces of the melton. The adhered seam glue is dried, and the multiple pieces of the melton are thereafter separated one by one, thereby obtaining melton having the seam glue adhered to the side surface. Two pieces of the melton are adhered to the outer surface of the core by an adhesive, and thereafter crosslinked, thereby forming a seam portion in a gap between the two pieces of the melton.

In this production method, tackiness for adhering multiple pieces of melton to each other by seam glue formed of an unvulcanized rubber composition after drying, and separability for separating, one by one, the multiple pieces of the melton adhered to each other in the subsequent process step of adhering the melton to the core, are required. Furthermore, if the seam portion formed after crosslinking still has tackiness (stickiness), a dirt component is likely to be adhered when the tennis ball is used, and, thus, deterioration of outer appearance may be caused. Therefore, the seam glue is required to have non-tackiness after vulcanization.

In recent years, in light of influence on the environment and reduction of load on workers, aqueous adhesives have been required instead of solvent-based adhesives. JP2020-059838 (Patent Literature 2) indicates that an aqueous adhesive, for a tennis ball, containing rubber latex and a sulfenamide-based vulcanization accelerator is used for adhering half cores to each other. JP57-179265 (Patent Literature 3) discloses a melton-seaming adhesive in which depolymerized natural rubber latex and/or synthetic rubber latex is used as a base material component.

In the solvent-based seam glue disclosed in Patent Literature 1, a rubber composition obtained by adding various chemicals to solid rubber such as natural rubber and the like and kneading the obtained product, is used. During the kneading, the solid rubber is peptized. The rubber component has a low molecular weight through the peptization, thereby obtaining tackiness, separability, and non-tackiness after vulcanization, which are appropriate for forming a seam portion. Meanwhile, the aqueous adhesive disclosed in Patent Literature 2 can be produced by, for example, adding a slurry of a vulcanization accelerator or the like to natural rubber latex. The molecular weight of the aqueous adhesive is not lowered since no kneading is performed during the production. Therefore, tackiness and separability equivalent to those of solvent-based seam glue cannot be obtained. For the melton-seaming adhesive disclosed in Patent Literature 3, depolymerization of rubber latex is required, thereby complicating the production process steps. Furthermore, there is still room for improvement in tackiness, separability, and non-tackiness after vulcanization in an adhesive in which depolymerized rubber latex is used.

An aqueous adhesive in which no organic solvent is used, tackiness and separability are equivalent to those of a solvent-based adhesive, and stickiness after vulcanization is reduced, has not been suggested. An object of the present disclosure is to provide an aqueous adhesive, for a tennis ball, which has excellent tackiness, separability, and non-tackiness after vulcanization, and allows a seam portion to be efficiently formed.

SUMMARY OF THE INVENTION

An aqueous adhesive, for a tennis ball, according to the present disclosure includes rubber latex. The rubber latex is a mixture of liquid rubber latex and solid rubber latex. When a solid content in the aqueous adhesive is measured at a temperature of 140° C. by a curelastometer, a torque is not less than 0.26 N·m after 10 minutes from start of heating.

A tennis ball according to the present disclosure includes: a core; two pieces of felt covering the core; and a seam positioned in a gap between the two pieces of the felt. The seam is formed of the above-described aqueous adhesive.

The aqueous adhesive, for a tennis ball, according to the present disclosure has tackiness, separability, and non-tackiness after vulcanization, which are appropriate for forming the seam. The tennis ball including the seam formed of the aqueous adhesive has excellent durability.

DESCRIPTION OF THE PREFERRED EMBODIMENTS

Figure 1:
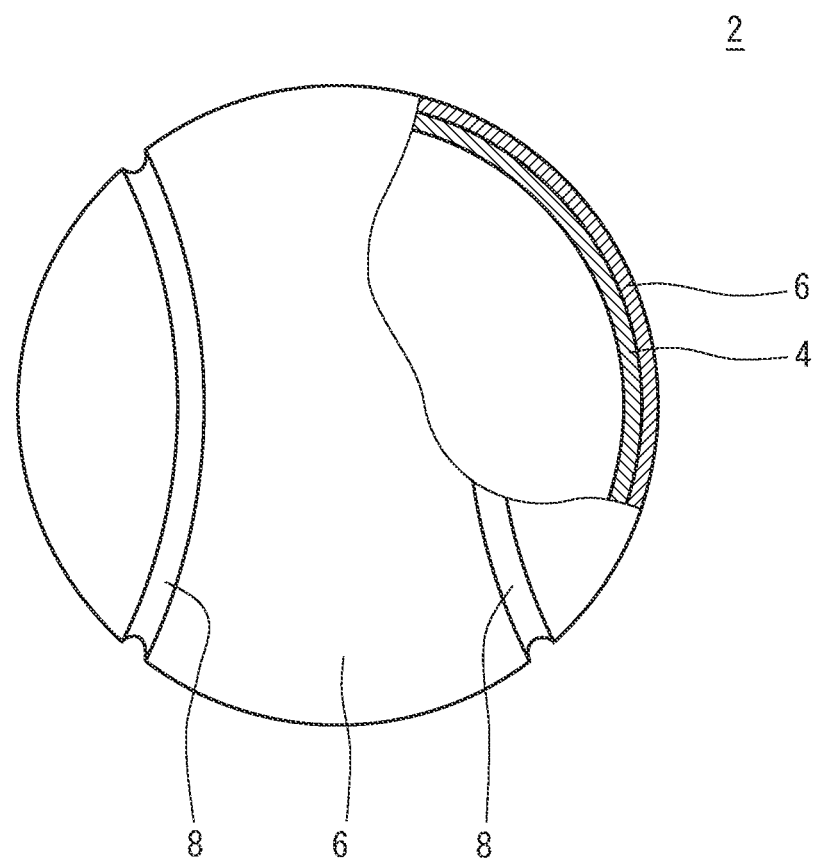
FIG. 1 is a partially cutaway cross-sectional view of a tennis ball obtained by using an adhesive according to one embodiment of the present disclosure.

The following will describe in detail the present disclosure based on preferred embodiments with appropriate reference to the accompanying drawing.

An aqueous adhesive, for a tennis ball, according to one embodiment of the present disclosure contains rubber latex. The rubber latex is a mixture of liquid rubber latex and solid rubber latex. In the description herein, the rubber latex represents an emulsion in which a rubber component in particulate form is dispersed in a dispersion medium such as water, an aqueous solution, or the like. Liquid rubber represents rubber having fluidity at normal temperature under atmospheric pressure. The liquid rubber latex represents an emulsion in which the liquid rubber in particulate form is dispersed in a dispersion medium. Solid rubber represents rubber that does not flow at normal temperature under atmospheric pressure. The solid rubber latex represents an emulsion in which the solid rubber in particulate form is dispersed in a dispersion medium.

In the rubber latex contained in the aqueous adhesive for a tennis ball, particulates formed of the liquid rubber and particulates formed of the solid rubber are dispersed in a dispersion medium such as water, an aqueous solution, or the like. The aqueous adhesive in which the rubber component contains the liquid rubber has excellent tackiness and separability in an unvulcanized state after drying. The aqueous adhesive allows a plurality of pieces of melton to be easily adhered to each other, and allows the adhered pieces of the melton to be separated without deformation. Furthermore, the aqueous adhesive substantially contains no organic solvent. The aqueous adhesive allows reduction of load on the environment and load on workers who use the aqueous adhesive.

Furthermore, when a solid content in the aqueous adhesive is measured at a temperature of 140° C. by a curelastometer in accordance with the method described in JIS-6300-2 "Rubber, unvulcanized-Physical property-Part 2: Determination of cure characteristics with oscillating curemeters", a torque is not less than 0.26 N·m after 10 minutes from the start of heating. The torque value $V_{10}$ measured after 10 minutes from the start of heating is an index indicating a progress state of a crosslinking reaction of an unvulcanized rubber composition obtained by drying the aqueous adhesive. The aqueous adhesive having the torque value $V_{10}$ of not less than 0.26 N·m reduces stickiness (tackiness) of a seam portion formed after vulcanization. The aqueous adhesive has excellent non-tackiness after vulcanization.

In light of reducing tackiness after vulcanization, the torque value $V_{10}$ is preferably not less than 0.27 N·m and more preferably not less than 0.28 N·m. In light of balance with separability and tackiness in an unvulcanized state, the torque value $V_{10}$ is preferably not greater than 0.80 N·m and more preferably not greater than 0.60 N·m.

When the solid content in the aqueous adhesive is measured at a temperature of 140° C. by a curelastometer, the maximum torque value $V_{max}$ is preferably not less than 0.28 N·m. The maximum torque value $V_{max}$ is an index indicating a crosslinking density obtained after the rubber composition contained in the aqueous adhesive is vulcanized. In the aqueous adhesive having the maximum torque value $V_{max}$ of not less than 0.28 N·m, non-tackiness after vulcanization is enhanced. This aqueous adhesive further reduces stickiness (tackiness) of the seam portion formed after vulcanization.

In light of enhancing non-tackiness after vulcanization, the maximum torque value $V_{max}$ is more preferably not less than 0.29 N·m and even more preferably not less than 0.30 N·m. In light of balance with separability and tackiness in an unvulcanized state, the maximum torque value $V_{max}$ is preferably not greater than 0.80 N·m and more preferably not greater than 0.60 N·m.

In light of tackiness and separability, a main component of the rubber latex contained in the aqueous adhesive is preferably the liquid rubber latex. In the description herein, the "main component" represents a component of which the content is not less than 50% by weight with respect to the entirety of the rubber latex. In other words, a ratio of the liquid rubber to the entire rubber component in the rubber latex is preferably not less than 50% by weight, more preferably not less than 55% by weight, and particularly preferably not less than 60% by weight in terms of solid content. Although the upper limit value of the ratio of the liquid rubber to the entire rubber component is not particularly limited as long as the effect according to the present disclosure is obtained, the upper limit value is preferably less than 95% by weight in light of non-tackiness after vulcanization.

A kind of each of the liquid rubber latex and the solid rubber latex is not particularly limited as long as tackiness, separability, and non-tackiness after vulcanization are appropriately obtained. Examples of a rubber component in each of the liquid rubber latex and the solid rubber latex include styrene-butadiene rubber, acrylonitrile-butadiene rubber, chloroprene rubber, butadiene rubber, isoprene rubber, isobutylene-isoprene rubber, ethylene-propylene rubber, and modified products thereof. Examples of the modified products include rubber modified with a functional group such as a carboxyl group, an amine group, a hydroxy group, and the like. Isoprene rubber or natural rubber is preferable since sulfur (vulcanizing agent) which may cause coloring after vulcanization need not be blended. Crosslinking caused by protein, phospholipid, or the like in natural rubber latex may unintentionally increase a green strength. In light of production stability, the rubber component is more preferably isoprene rubber.

The number average molecular weight of the liquid rubber contained in the liquid rubber latex is not particularly limited as long as the effect according to the present disclosure is obtained, and can be selected as appropriate according to the kind. In light of easily obtaining good tackiness, separability, and transition resistance, the number average molecular weight of the liquid rubber is preferably not greater than 60,000 and more preferably not greater than 40,000. Meanwhile, the number average molecular weight of the liquid rubber is preferably not less than 10,000 and more preferably not less than 20,000.

The number average molecular weight of the solid rubber contained in the solid rubber latex is not particularly limited as long as the effect according to the present disclosure is obtained, and can be selected as appropriate according to the kind. In light of easily obtaining good tackiness, separability, and transition resistance, the number average molecular weight of the solid rubber is preferably not greater than 3,000,000 and more preferably not greater than 2,000,000. Meanwhile, the number average molecular weight of the solid rubber is preferably not less than 500,000 and more preferably not less than 1,000,000.

In light of miscibility with various additives described below, a solid content concentration of the rubber latex is preferably not greater than 80% by weight and more preferably not greater than 70% by weight. In light of adhesive strength, the solid content concentration of the rubber latex is preferably not less than 20% by weight and more preferably not less than 30% by weight. The solid content concentration of the rubber latex is obtained in accordance with the method described in JIS K6387-2 "Latex, rubber-Determination of total solids content".

The aqueous adhesive for a tennis ball preferably contains a vulcanizing agent and/or a vulcanization accelerator in addition to the rubber latex. The kind of each of the vulcanizing agent and the vulcanization accelerator is not particularly limited as long as the effect according to the present disclosure is not inhibited. Examples of the vulcanizing agent include sulfur such as powdery sulfur, insoluble sulfur, precipitated sulfur, colloidal sulfur, and the like; and sulfur compounds such as morpholine disulfide, alkylphenol disulfide, and the like. Examples of the vulcanization accelerator include aldehyde-ammonia-based vulcanization accelerators, aldehyde-amine-based vulcanization accelerators, thiazole-based vulcanization accelerators, sulfenamide-based vulcanization accelerators, thiuram-based vulcanization accelerators, dithiocarbamate-based vulcanization accelerators, guanidine-based vulcanization accelerators, thiourea-based vulcanization accelerators, and xanthate-based vulcanization accelerators.

One of the vulcanizing agents and/or the vulcanization accelerators may be used, or two or more of them may be used in combination. In light of balance among tackiness, separability, and non-tackiness after vulcanization, the vulcanizing agent and a thiuram-based vulcanization accelerator and/or a sulfenamide-based vulcanization accelerator are preferably used in combination. Sulfur is preferable as the vulcanizing agent. A thiuram-based vulcanization accelerator is more preferable as the vulcanization accelerator. Sulfur blended as the vulcanizing agent may cause coloring of the obtained seam portion. Therefore, the aqueous adhesive that substantially contains no sulfur is preferable. In the description herein, sulfur represents sulfur as a single element such as powdery sulfur and the like.

In light of non-tackiness after vulcanization, the total amount of the vulcanizing agent and/or the vulcanization accelerator contained in the aqueous adhesive is preferably not less than 3.5 parts by weight and more preferably not less than 4.0 parts by weight with respect to 100 parts by weight of the rubber component in terms of solid content. In light of fluidity during vulcanization, the total amount is preferably not greater than 8.0 parts by weight and more preferably not greater than 6.0 parts by weight in terms of solid content.

In a case where the aqueous adhesive contains the vulcanization accelerator and contains no vulcanizing agent, the total amount of the vulcanization accelerator is preferably not less than 3.8 parts by weight and more preferably not less than 4.0 parts by weight with respect to 100 parts by weight of the rubber component in terms of solid content. In light of tackiness and separability, the total amount of the vulcanization accelerator is preferably not greater than 8.0 parts by weight and more preferably not greater than 6.0 parts by weight in terms of solid content.

In a case where the aqueous adhesive contains the vulcanizing agent in addition to the vulcanization accelerator, an amount of the vulcanizing agent is preferably not less than 3.5 parts by weight and more preferably not less than 4.0 parts by weight with respect to 100 parts by weight of the rubber component in terms of solid content. In light of tackiness and separability, the amount of the vulcanizing agent is preferably not greater than 8.0 parts by weight and more preferably not greater than 6.0 parts by weight in terms of solid content.

The aqueous adhesive may further contain a filler such as silica, carbon black, calcium carbonate, calcium hydroxide, magnesium hydroxide, talc, mica, diatomaceous earth, titanium oxide, zinc oxide, bismuth oxide, barium sulfate, magnesium carbonate, alumina, and the like as long as the effect according to the present disclosure is obtained. A filler selected from the group consisting of titanium oxide, silica, and zinc oxide is preferable. In light of strength of the formed seam portion, the total amount of the fillers in the aqueous adhesive is preferably not less than 5 parts by weight and more preferably not less than 15 parts by weight with respect to 100 parts by weight of the entire rubber component in terms of solid content. In light of fluidity during vulcanization, the amount of the fillers is preferably not greater than 40 parts by weight and more preferably not greater than 30 parts by weight in terms of solid content.

The aqueous adhesive may further contain various additives such as a vulcanization acceleration aid, a thickener, a tackifier, an anti-aging agent, an antioxidant, a light stabilizer, a softener, a processing aid, a coloring agent, and the like as long as the effect according to the present disclosure is not inhibited.

A concentration of the total solid content contained in the aqueous adhesive is not particularly limited as long as the effect according to the present disclosure is obtained. In light of strength of the obtained seam portion, the solid content concentration is preferably not less than 5.0% by weight and more preferably not less than 10% by weight. In light of fluidity during vulcanization, the solid content concentration is preferably not greater than 80% by weight and more preferably not greater than 70% by weight.

In light of adhesiveness to the immersed melton, a viscosity of the aqueous adhesive is preferably not less than 15 Pa·s and more preferably not less than 17 Pa·s. In light of fluidity, the viscosity of the aqueous adhesive is preferably not greater than 25 Pa·s and more preferably not greater than 20 Pa·s. The viscosity of the aqueous adhesive is measured at a temperature of 23±1° C. by using a Brookfield rotational viscometer (rotor: No. 3) in accordance with the description in JIS Z8803 "Methods for viscosity measurement of liquid". In a case where the viscosity is not greater than 20 Pa·s, the rotation speed is 10 rpm. In a case where the viscosity is greater than 20 Pa·s, the rotation speed is 5 rpm.

A method for producing the aqueous adhesive for a tennis ball is not particularly limited. For example, the liquid rubber latex and the solid rubber latex are blended, and, thereafter, the additives such as vulcanizing agent and/or vulcanization accelerator, the filler, and the like are sequentially added and mixed, thereby producing the aqueous adhesive. The additives such as vulcanizing agent and/or vulcanization accelerator, and the like may be mixed, as they are, with the rubber latex, or may be mixed as respective slurries of the additives.

The slurry of each additive is obtained by putting the additive in a dispersion medium containing a dispersant and mixing them. A kind of the dispersant contained in the dispersion medium is not particularly limited, and the dispersant is selected as appropriate from anionic, nonionic, and cationic surfactants according to a kind of the additive and the concentration of the slurry, and used. Examples of the anionic surfactant include a C8 to C20 alkylsulfonate, alkylaryl sulfate, sodium naphthalenesulfonate-formaldehyde condensates, and alkali metal salts of rosin acids. Examples of the nonionic surfactant include aromatic polyglycol ether, polyvinyl alcohol, polyoxyethylene alkyl ether, and polyoxyethylene monostearate. Examples of the cationic surfactant include dilauryldimethylammonium chloride, hexadecyltrimethylammonium chloride, octadecyltrimethylammonium chloride, and dodecyltrimethylammonium chloride. The anionic or nonionic surfactant is preferable. Two or more kinds of the surfactants may be used in combination.

In light of stability of the slurry, a concentration of the dispersant in the dispersion medium is preferably not less than 0.5% by weight and more preferably not less than 1.0% by weight. In light of the adhesive strength of the obtained adhesive, the concentration of the dispersant in the dispersion medium is preferably not greater than 20% by weight and more preferably not greater than 15% by weight.

The dispersion medium can also be used for adjusting the solid content concentration of the liquid rubber latex and the solid rubber latex. After the liquid rubber latex and the solid rubber latex are blended, the solid content concentration may be adjusted by adding the dispersion medium. After the liquid rubber latex and the solid rubber latex are blended and each additive is thereafter added to mix them, the solid content concentration may be adjusted by using the dispersion medium.

The aqueous adhesive for a tennis ball can be preferably used for producing, for example, regulation tennis balls. FIG. 1 shows a tennis ball 2 obtained by using the aqueous adhesive according to one embodiment of the present disclosure. The tennis ball 2 includes a hollow core 4, two felt portions 6 covering the core 4, and a seam portion 8 positioned in a gap between the two felt portions 6. The thickness of the core 4 is about 3 mm to 4 mm in general. The inside of the core 4 is filled with compressed gas. The two felt portions 6 are adhered to the surface of the core 4 by the adhesive.

Figure 2A:
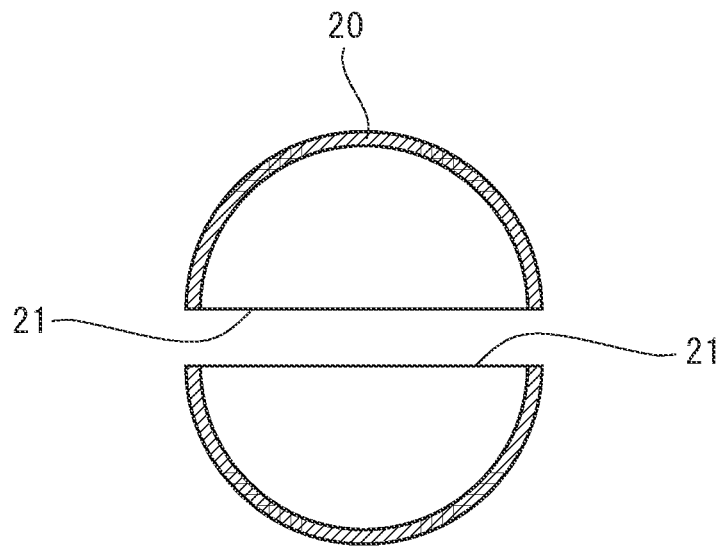
FIG. 2A is a cross-sectional view illustrating forming of a core of the tennis ball shown in FIG. 1.
Figure 2B:
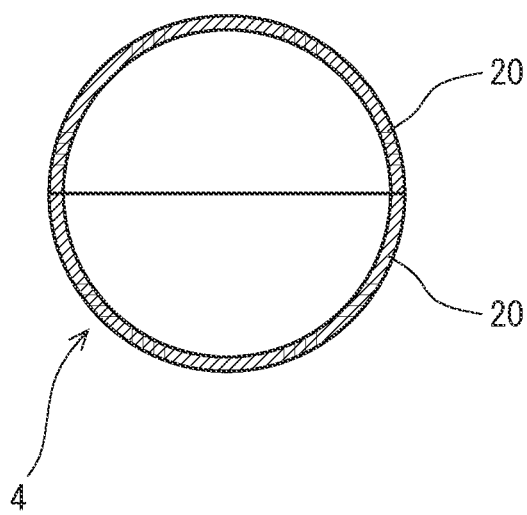
FIG. 2B is a cross-sectional view illustrating the forming of the core of the tennis ball shown in FIG. 1.

FIG. 2 is a cross-sectional view illustrating forming of the core 4 of the tennis ball 2 shown in FIG. 1. As shown in FIG. 2A, two half cores 20 are firstly prepared in the forming of the core 4. Each of the half cores 20 is hemispherical-shell-shaped, and has an annular edge portion 21. Next, the aqueous adhesive, for a tennis ball, according to the present disclosure is applied to the edge portion 21 of each half core 20, and water and tablets of sodium chloride and sodium nitrite are put into one of the half cores 20. Thereafter, as shown in FIG. 2B, the two half cores 20 are adhered to each other at the respective edge portions 21. The spherical body formed of the two half cores 20 is put into a predetermined mold, and heated and pressurized, thereby forming the hollow core 4.

The core 4 is formed by crosslinking a rubber composition containing base rubber, a vulcanizing agent, a vulcanization accelerator, a filler, and the like. Preferable examples of the base rubber include natural rubber, polybutadiene, polyisoprene, styrene-butadiene copolymers, acrylonitrile-butadiene copolymers, polychloroprene, ethylene-propylene copolymers, ethylene-propylene-diene copolymers, isobutylene-isoprene copolymers, and acrylic rubber. The base rubber is more preferably natural rubber and polybutadiene. As the base rubber, two or more kinds of the rubbers may be used in combination. The rubber composition of the core 4 may further contain an additive such as a vulcanization aid, an anti-aging agent, an antioxidant, a light stabilizer, a softener, a processing aid, a coloring agent, or the like.

The method for producing the rubber composition is not particularly limited as long as the object of the present disclosure is achieved. For example, the rubber composition may be produced by heating and pressurizing a kneaded product obtained by putting and kneading the base rubber and the additives selected as appropriate, in a known kneading machine such as a Banbury mixer, a kneader, a roll, or the like. The kneading conditions and the vulcanization conditions are selected according to blending in the rubber composition. The kneading temperature is preferably not lower than 50° C. and not higher than 180° C. The vulcanization temperature is preferably not lower than 140° C. and not higher than 180° C. The vulcanization time is preferably not shorter than two minutes and not longer than 60 minutes.

Next, woven felt is cut so as to be dumbbell-shaped, and the multiple felt portions 6 (melton) are prepared. The multiple felt portions 6 are stacked and thereafter immersed in the above-described aqueous adhesive, whereby the aqueous adhesive is adhered to side surfaces (cut faces) of the multiple felt portions 6. Thereafter, the aqueous adhesive is dried, whereby the side surfaces of the multiple felt portions 6 are adhered to each other by the unvulcanized rubber composition. Among the multiple adhered felt portions 6, two felt portions 6 are separated and adhered to the outer surface of the core 4, and pressurized and heated. The rubber composition adhered to the side surface of the felt portion 6 is vulcanized by the pressurization and heating to obtain the tennis ball 2 having the seam portion 8 formed in a gap between the two felt portions 6.

The aqueous adhesive for a tennis ball has good tackiness and separability. Therefore, the felt portion 6 having an appropriate amount of unvulcanized rubber composition adhered to the side surface can be efficiently obtained. The aqueous adhesive has appropriate fluidity during vulcanization. Therefore, the seam portion 8 can be formed in a gap between the two felt portions 6 without forming spaces. The aqueous adhesive has excellent non-tackiness after vulcanization. Therefore, the seam portion 8 which does not have stickiness is formed. The tennis ball 2 including the seam portion 8 can maintain good outer appearance for a long time period since dirt or the like is unlikely to be adhered in use. The tennis ball 2 has high durability. The aqueous adhesive allows a high quality tennis ball 2 to be efficiently produced.

EXAMPLES

The following will show the effects according to the present disclosure by means of Examples, but the present disclosure should not be construed in a limited manner on the basis of the description of these Examples.

Example 1

Preparation of Dispersion Medium 100 parts by weight of purified water, 1.6 parts by weight of Tamol NN 9104 (manufactured by BASF, naphthalene sulfonic acid/formaldehyde condensate, sodium salt), 0.6 parts by weight of Emulvin W (aromatic polyglycol ether manufactured by LANXESS), and 0.4 parts by weight of ammonia water (manufactured by Wako Pure Chemical Industries, Ltd., concentration of 28% by weight), were blended to obtain a dispersion medium.

Preparation of Thickener 50 parts by weight of A-7075 (acrylic polymer emulsion manufactured by TOAGOSEI CO., LTD.) and 9.0 parts by weight of ammonia water (manufactured by Wako Pure Chemical Industries, Ltd., concentration of 28% by weight) were added to 100 parts by weight of purified water to obtain a thickener.

Preparation of Rubber Latex

The dispersion medium was added to "KURAPRENE LIR-700 (trade name)" manufactured by Kuraray Co., Ltd. and 1.4-fold dilution was performed, whereby liquid rubber latex having the solid content concentration of 43% by weight was obtained. The obtained liquid rubber latex and solid rubber latex (trade name "Cariflex IR0401 SU" manufactured by Cariflex PTE. Ltd., solid content concentration of 63% by weight) were mixed, and rubber latex E1 in which a ratio between the liquid rubber and the solid rubber was 70:30 in terms of solid content was obtained.

Preparation of Slurry of Additive

The above-described dispersion medium was added to each of titanium oxide (trade name "Disoertint TB60" manufactured by Behn Meyer), zinc oxide (trade name "Disoertint ZnO60" manufactured by Behn Meyer), silica (trade name "SEAHOSTAR KE W50" manufactured by NIPPON SHOKUBAI CO., LTD.), sulfur (trade name "Disperacc Sulphur 60" manufactured by Behn Meyer), an anti-aging agent (trade name "K-840" manufactured by Chukyo Yushi Co., Ltd.), a vulcanization accelerator DPTT (trade name "Nocceler TRA" manufactured by Ouchi Shinko Chemical Industrial Co., Ltd.), and a vulcanization accelerator CBS (trade name "Nocceler CZ" manufactured by Ouchi Shinko Chemical Industrial Co., Ltd.), and each of the obtained products was stirred by using a ball mill for 24 hours, thereby preparing each slurry having a solid content concentration of 60% by weight.

Preparation of Aqueous Adhesive

While the obtained rubber latex E1 was stirred at 150 rpm by using a Three-One motor, the slurry of titanium oxide, the slurry of zinc oxide, the slurry of silica, the slurry of the anti-aging agent, and the slurries of the two kinds of the vulcanization accelerators were sequentially added, and the above-described thickener was thereafter added to adjust the viscosity to 15 to 20 Pa·s, thereby obtaining an aqueous adhesive of Example 1. As a solid content composition in the aqueous adhesive of Example 1, titanium oxide: 7.22 parts by weight, zinc oxide: 5 parts by weight, silica: 8 parts by weight, the anti-aging agent: 0.51 parts by weight, the vulcanization accelerator DPTT: 2.54 parts by weight, and the vulcanization accelerator CBS: 2 parts by weight were contained with respect to 100 parts by weight of the entire rubber component.

Examples 2 to 3 and Comparative Examples 1 to 9

Aqueous adhesives of Examples 2 to 3 and Comparative examples 1 to 9 were obtained in the same manner as in Example 1 except that the solid content compositions were as indicated below in Tables 1 to 3.

Measurement by Curelastometer

Test pieces for measurement by a curelastometer were produced by collecting a part of the aqueous adhesive of each of Examples 1 to 3 and Comparative examples 1 to 9 and drying the part of the aqueous adhesive at 60° C. for 24 hours.

A curing test for each test piece was performed at a measurement temperature of 140° C., an amplitude angle of ±3°, and a frequency of 100 cpm for 60 minutes by using a curelastometer (curelastometer 7 available from JSR Trading Co., Ltd.) in accordance with JIS K6300-2 "Rubber, unvulcanized-Physical property-Part 2: Determination of cure characteristics with oscillating curemeters". A torque (unit: N·m) measured after 10 minutes from the start of heating and the maximum torque (unit: N·m) are indicated below as $V_{10}$ (140° C.) and $V_{max}$ (140° C.), respectively, in Tables 1 to 3.

Evaluation of Separability and Tackiness

Woven felt was punched so as to be dumbbell-shaped, and multiple pieces of melton were obtained. Several tens of pieces of the melton were stacked, held between two end plates, and immersed in the aqueous adhesive for 20 seconds. After the immersion, the aqueous adhesive adhered to the side surfaces of the stacked pieces of the melton was dried for 96 hours. After the drying, separability of the fixed pieces of the melton from each other and tackiness were evaluated based on the following criteria. The evaluation results obtained for the aqueous adhesives of Examples 1 to 3 and Comparative examples 1 to 9 are indicated below in tables 1 to 3.

<Separability>: Separability of the adhered pieces of the melton from each other and deformation at the time of the separation were observed.

A . . . The melton did not extend at the time of the separation.

B . . . The melton extended at the time of the separation.

C . . . Separation was impossible.

<Tackiness>: Adhesiveness of the pieces of the melton to each other and change with the passage of time were observed.

A . . . A plurality of pieces of the melton were adhered to each other after drying and were not separated after passage of time.

B . . . A plurality of pieces of the melton were adhered to each other after drying but were separated with the passage of time.

C . . . The pieces of the melton were separated soon after drying.

Evaluation of Non-Tackiness after Vulcanization

A rubber composition, for a core, in which sulfur and a vulcanization accelerator were added to a kneaded product obtained by kneading base rubber and a filler, was put in a mold, and heated and pressurized, to form two hemispherical half cores. The two half cores were adhered to each other to obtain a hollow test core. Separately, woven felt was punched so as to be dumbbell-shaped, and multiple pieces of melton were obtained. Several tens of pieces of the melton were stacked, held between two end plates, and immersed in the aqueous adhesive for 20 seconds. After the immersion, the aqueous adhesive adhered to the side surfaces of the stacked pieces of the melton was dried for 96 hours. After the drying, two pieces of the melton having the aqueous adhesive adhered to the side surfaces were separated, adhered to the outer surface of the test core, and heated in a mold at 140° C., to form a seam portion. Then, non-tackiness after vulcanization was evaluated based on the following criteria. The evaluation results obtained for the aqueous adhesives of Examples 1 to 3 and Comparative examples 1 to 9 are indicated below in Tables 1 to 3.

<Non-tackiness after vulcanization>: Whether or not the seam portion had stickiness was observed.

A . . . The seam portion did not have stickiness.

C . . . The seam portion had stickiness.

TABLE 1

Solid content compositions (phr) and evaluation results

|  | Ex. 1 | Ex. 2 | Ex. 3 |
|---|---|---|---|
| L-IR | 70 | 70 | 70 |
| S-IR | 30 | 30 | 30 |
| NR | — | — | — |
| $TiO_2$ | 7.22 | 7.22 | 7.22 |
| ZnO | 5 | 5 | 5 |
| Silica | 8 | 8 | 8 |
| K-840 | 0.51 | 0.51 | 0.51 |
| DPTT | 2.54 | 2.54 | 2.54 |
| CBS | 2 | — | — |
| Sulfur | — | 1.03 | 2.02 |
| $V_{10}$ (140° C.) | 0.282 | 0.271 | 0.486 |
| $V_{max}$ (140° C.) | 0.294 | 0.316 | 0.556 |
| Separability | A | A | A |
| Tackiness | A | A | A |
| Non-tackiness (after vulcanization) | A | A | A |

TABLE 2

Solid content compositions (phr) and evaluation results

|  | Comp. Ex. 1 | Comp. Ex. 2 | Comp. Ex. 3 | Comp. Ex. 4 |
|---|---|---|---|---|
| L-IR | 70 | 70 | 70 | 70 |
| S-IR | 30 | 30 | 30 | 30 |
| NR | — | — | — | — |
| $TiO_2$ | 7.22 | 14.6 | 22.1 | 29.6 |
| ZnO | 5 | 5 | 5 | 5 |
| Silica | 8 | 8 | 8 | 8 |
| K-840 | 0.51 | 0.51 | 0.51 | 0.51 |
| DPTT | 2.54 | 2.54 | 2.54 | 2.54 |
| CBS | — | — | — | — |
| Sulfur | — | — | — | — |
| $V_{10}$ (140° C.) | 0.134 | 0.142 | 0.168 | 0.156 |
| $V_{max}$ (140° C.) | 0.154 | 0.163 | 0.189 | 0.179 |
| Separability | A | A | B | C |
| Tackiness | A | A | A | A |
| Non-tackiness (After vulcanization) | C | C | C | C |

TABLE 3

Solid content compositions (phr) and evaluation results

|  | Comp. Ex. 5 | Comp. Ex. 6 | Comp. Ex. 7 | Comp. Ex. 8 | Comp. Ex. 9 |
|---|---|---|---|---|---|
| L-IR | 70 | 70 | 70 | — | — |
| S-IR | 30 | 30 | 30 | 100 | — |
| NR | — | — | — | — | 100 |
| $TiO_2$ | 7.22 | 7.22 | 7.22 | 7.22 | 14.6 |
| ZnO | 5 | 5 | 5 | 5 | 5 |
| Silica | 8 | 8 | 8 | 8 | 8 |
| K-840 | 0.51 | 0.51 | 0.51 | 0.51 | 0.51 |
| DPTT | 2.54 | 2.54 | 2.54 | 2.54 | 2.54 |
| CBS | 0.5 | 1.0 | — | — | — |
| Sulfur | — | — | 0.5 | — | — |
| $V_{10}$ (140° C.) | 0.182 | 0.250 | 0.177 | 0.810 | 0.505 |
| $V_{max}$ (140° C.) | 0.183 | 0.251 | 0.205 | 0.812 | 0.509 |
| Separability | A | A | A | C | C |
| Tackiness | A | A | A | B | C |
| Non-tackiness (after vulcanization) | C | C | C | A | A |

Details of the compounds indicated in Tables 1 to 3 are as follows.

L-IR: isoprene rubber latex (liquid rubber latex manufactured by Kuraray Co., Ltd., trade name "KURAPRENE LIR-700")

S-IR: isoprene rubber latex (solid rubber latex manufactured by Cariflex PTE. Ltd., trade name "Cariflex IR0401 SU")

NR: natural rubber latex (solid rubber latex available from Nomura Trading Co., Ltd., "HYTEX-HA")

$TiO_2$: titanium oxide manufactured by Behn Meyer, trade name "Disoertint TB60"

ZnO: zinc oxide manufactured by Behn Meyer, trade name "Disoertint ZnO60"

Silica: trade name "SEAHOSTAR KE W50" manufactured by NIPPON SHOKUBAI CO., LTD.

K-840: anti-aging agent manufactured by Chukyo Yushi Co., Ltd.

DPTT: thiuram-based vulcanization accelerator manufactured by Ouchi Shinko Chemical Industrial Co., Ltd., trade name "Nocceler TRA"

CBS: sulfenamide-based vulcanization accelerator manufactured by Ouchi Shinko Chemical Industrial Co., Ltd., trade name "Nocceler CZ"

Sulfur: trade name "Disperacc Sulphur 60" manufactured by Behn Meyer

As indicated in Tables 1 to 3, evaluations for the aqueous adhesives of the Examples were higher than evaluations for the aqueous adhesives of the Comparative examples. The evaluation results clearly indicate that the technique of the present disclosure is superior.

The aqueous adhesive described above is applicable to production of various hollow balls. The above descriptions are merely illustrative examples, and various modifications can be made without departing from the principles of the present disclosure.

Disclosure Contents

The following items each represent disclosure of the preferred embodiment.

According to one aspect of the present disclosure, an aqueous adhesive for a tennis ball includes rubber latex. The rubber latex is a mixture of liquid rubber latex and solid rubber latex. When a solid content in the aqueous adhesive is measured at a temperature of 140° C. by a curelastometer, a torque is not less than 0.26 N·m after 10 minutes from start of heating.

According to one aspect, when the solid content in the aqueous adhesive is measured at a temperature of 140° C. by a curelastometer, a maximum torque value may be not less than 0.28 N·m.

According to one aspect, a main component of the rubber latex may be liquid rubber latex. Furthermore, according to one aspect, a rubber component of the liquid rubber latex may be isoprene rubber.

According to one aspect, the aqueous adhesive may further include a vulcanizing agent and/or a vulcanization accelerator. According to one aspect, the vulcanizing agent may be sulfur. Furthermore, the vulcanization accelerator may be a thiuram-based vulcanization accelerator and/or a sulfenamide-based vulcanization accelerator.

According to one aspect, the aqueous adhesive may further include a filler. According to one aspect, the filler may be selected from the group consisting of titanium oxide, silica, and zinc oxide.

According to one aspect, a total amount of the vulcanizing agent and the vulcanization accelerator in the aqueous adhesive may be not less than 3.5 parts by weight and not greater than 8.0 parts by weight with respect to 100 parts by weight of a rubber component in the rubber latex in terms of solid content.

According to one aspect, a total amount of the filler in the aqueous adhesive may be not less than 5 parts by weight and not greater than 40 parts by weight with respect to 100 parts by weight of the rubber component in the rubber latex in terms of solid content.

According to one aspect, a solid content concentration of the aqueous adhesive may be not less than 5.0% by weight and not greater than 80% by weight.

From another viewpoint, according to one aspect, a tennis ball includes: a core; two pieces of felt covering the core; and a seam positioned in a gap between the two pieces of the felt. The seam is formed of any of the above-described aqueous adhesives.

What is claimed is:

1. A tennis ball comprising:
  a core;
  two pieces of felt covering the core; and
  a seam positioned in a gap between the two pieces of the felt, wherein
  the seam is formed of an aqueous adhesive, the aqueous adhesive comprising:
  rubber latex, wherein
  the rubber latex is a mixture of liquid rubber latex and solid rubber latex, and
  when a solid content in the aqueous adhesive is measured at a temperature of 140° C. by a curelastometer, a torque is not less than 0.26 N·m after 10 minutes from start of heating.

2. The tennis ball according to claim 1, wherein, when the solid content in the adhesive is measured at a temperature of 140° C. by a curelastometer, a maximum torque value is not less than 0.28 N·m.

3. The tennis ball according to claim 1, wherein a main component of the rubber latex is liquid rubber latex.

4. The tennis ball according to claim 3, wherein a rubber component of the liquid rubber latex is isoprene rubber.

5. The tennis ball according to claim 1, further comprising a vulcanizing agent and/or a vulcanization accelerator.

6. The tennis ball according to claim 5, wherein the vulcanizing agent is sulfur.

7. The tennis ball according to claim 5, wherein the vulcanization accelerator is a thiuram-based vulcanization accelerator and/or a sulfenamide-based vulcanization accelerator.

8. The tennis ball according to claim 5, wherein a total amount of the vulcanizing agent and the vulcanization accelerator is not less than 3.5 parts by weight and not greater than 8.0 parts by weight with respect to 100 parts by weight of a rubber component in the rubber latex in terms of solid content.

9. The tennis ball according to claim 1, further comprising a filler, wherein
  the filler is selected from the group consisting of titanium oxide, silica, and zinc oxide.

10. The tennis ball according to claim 9, wherein a total amount of the filler is not less than 5 parts by weight and not greater than 40 parts by weight with respect to 100 parts by weight of the rubber component in the rubber latex in terms of solid content.

11. The tennis ball according to claim 1, wherein a solid content concentration of the aqueous adhesive is not less than 5.0% by weight and not greater than 80% by weight.

* * * * *